(12) United States Patent
Inoue et al.

(10) Patent No.: US 11,612,039 B2
(45) Date of Patent: Mar. 21, 2023

(54) REAR LAMP UNIT CONTROL SYSTEM

(71) Applicant: HONDA MOTOR CO., LTD., Tokyo (JP)

(72) Inventors: Naoto Inoue, Tokyo (JP); Go Shimizu, Tokyo (JP); Masayoshi Takori, Wako (JP); Ikuo Koyama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/681,720

(22) Filed: Feb. 26, 2022

(65) Prior Publication Data
US 2022/0295623 A1 Sep. 15, 2022

(30) Foreign Application Priority Data
Mar. 10, 2021 (JP) .............................. JP2021-038686

(51) Int. Cl.
H05B 47/155 (2020.01)
B60Q 1/34 (2006.01)
B60Q 1/44 (2006.01)

(52) U.S. Cl.
CPC ............. H05B 47/155 (2020.01); B60Q 1/34 (2013.01); B60Q 1/44 (2013.01); B60Q 2400/00 (2013.01)

(58) Field of Classification Search
None
See application file for complete search history.

(56) References Cited

U.S. PATENT DOCUMENTS

| 9,863,621 | B2 * | 1/2018 | Dai .......................... B60Q 3/30 |
| 2006/0017304 | A1 | 1/2006 | Bischoff et al. |
| 2018/0054862 | A1 * | 2/2018 | Takagimoto ........... H05B 47/20 |
| 2020/0238897 | A1 * | 7/2020 | Robertson ............... F21V 21/22 |

FOREIGN PATENT DOCUMENTS

JP 2006-027597 A 2/2006

* cited by examiner

Primary Examiner — Crystal L Hammond
(74) Attorney, Agent, or Firm — Rankin, Hill & Clark LLP

(57) ABSTRACT

A rear lamp unit control system for a vehicle including: a first lamp provided on a vehicle body side of a vehicle rear face; a second lamp provided on an opening-closing body side of the vehicle rear face; and a controller configured to control the first lamp and the second lamp. When an opening-closing body of the vehicle is in a closed state, the controller is configured to control the first lamp and the second lamp so that the first lamp and the second lamp turn on at different luminous intensities to each other. In response to the second lamp being in need to be turned on when the opening-closing body is in an open state, the controller is configured to turn the first lamp on at a luminous intensity that is equivalent to a luminous intensity of the second lamp when the second lamp is turned on.

3 Claims, 6 Drawing Sheets

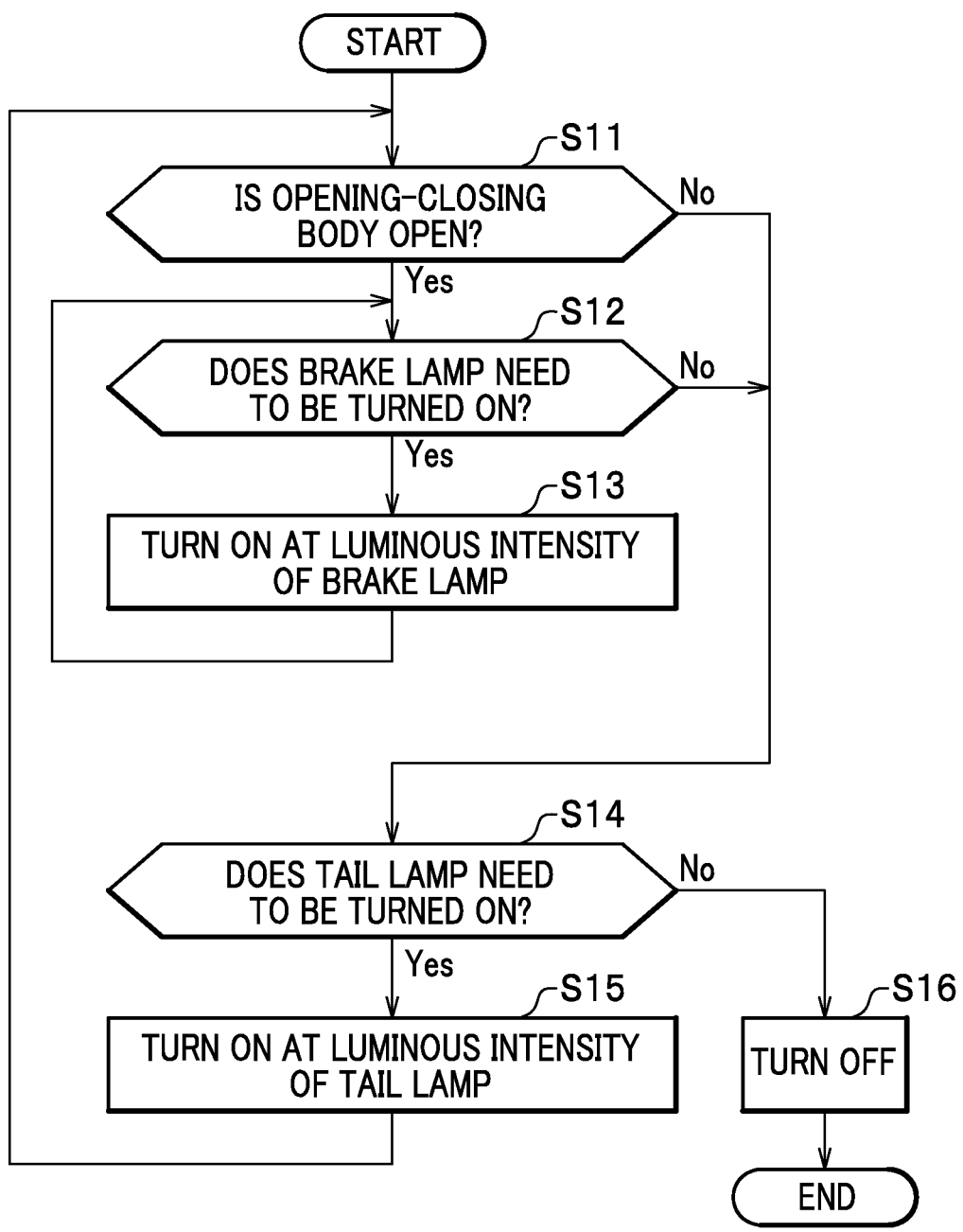

REAR LAMP UNIT CONTROL SYSTEM

CROSS-REFERENCE STATEMENT

The present application is based on, and claims priority from, Japanese Patent Application Number 2021-038686, filed Mar. 10, 2021, the disclosure of which is hereby incorporated by reference herein in its entirety.

BACKGROUND

Technical Field

The disclosure relates to a rear lamp unit control system.

Related Art

Patent Literature 1 (Japanese Unexamined Patent Application Publication No. 2006-27597) discloses a structure including a rear lamp unit provided on a vehicle body side and a cover that can open and close an aperture formed on the vehicle body, in which the cover in a closed state partially overlaps with the rear lamp unit and an overlapping region of the cover is either transparent or translucent.

The technique disclosed in Patent Literature 1 has limitations in designing the aperture and the rear lamp unit because the rear lamp unit is provided on the vehicle body side.

SUMMARY

A rear lamp unit control system for a vehicle according to the disclosure is a rear lamp unit control system including: a first lamp provided on a vehicle body side of a vehicle rear face; a second lamp provided on an opening-closing body side of the vehicle rear face; and a controller configured to control the first lamp and the second lamp. When an opening-closing body of the vehicle at the vehicle rear face is in a closed state, the controller is configured to control the first lamp and the second lamp so that the first lamp and the second lamp turn on at different luminous intensities to each other. In response to the second lamp being in need to be turned on when the opening-closing body is in an open state, the controller is configured to turn the first lamp on at a luminous intensity that is equivalent to a luminous intensity of the second lamp when the second lamp is turned on.

DRAWINGS

FIG. 6 is a flowchart for explaining an example of control of a first lamp by a rear lamp unit control system according to the second embodiment of the disclosure.

DETAILED DESCRIPTION

Figure 1A:
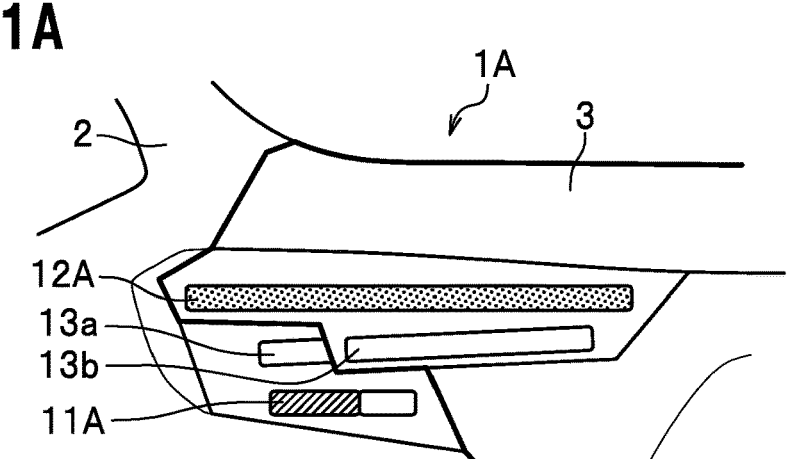
FIG. 1A is a schematic diagram of a rear face of a vehicle adopting a rear lamp unit control system in accordance with a first embodiment of the disclosure.

Embodiments of the disclosure will be described below with reference to the drawings as appropriate. The same constituents will be designated with the same reference signs and overlapping explanations thereof will be omitted. Terms indicating directions such as upper and lower directions, front and rear directions, and right and left directions (or a vehicle width direction) will be based on the viewpoint of a passenger (a driver) of a vehicle.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

First Embodiment

As shown in FIG. 1, a rear lamp unit control system 1A according to a first embodiment of the disclosure is a system that controls a pair of right and left rear lamp units provided on a vehicle rear face. The rear lamp units are bilaterally symmetrically provided on the vehicle rear face. In the following, the rear lamp unit on the left side will be described as an example. Meanwhile, in the drawings, a state of a lamp emitting light at a high luminous intensity will be indicated by hatching while a state of a lamp emitting light at a low luminous intensity will be indicated by using dots.

The rear lamp unit control system 1A includes a first lamp 11A, a second lamp 12A, and turn signal indicators 13a and 13b, which collectively constitute a rear lamp unit. The first lamp 11A, the second lamp 12A, and the turn signal indicators 13a and 13b are arranged at an end portion in a vehicle width direction of the vehicle rear face. The order of arrangement from the bottom upwards is the first lamp 11A, the turn signal indicators 13a and 13b, and the second lamp 12A.

First Lamp (Brake Lamp Also Serving as Tail Lamp

The first lamp 11A is provided on a vehicle body side 2 of the vehicle rear face (hereinafter simply referred to as a vehicle body rear face). The first lamp 11A is configured to change its luminous intensity through control by a controller 30. The first lamp 11A is mainly turned on as a high luminous intensity brake lamp, and is turned on as a low luminous intensity tail lamp as needed.

Second Lamp (Tail Lamp)

The second lamp 12A is provided on an opening-closing body (such as a lid of a trunk room or a tailgate; hereinafter simply referred to as the opening-closing body) 3 that can open and close an aperture 2a of the vehicle rear face. The second lamp 12A is turned on as a low luminous intensity tail lamp. A lateral width of the second lamp 12A is larger than a lateral width of the first lamp 11A.

Turn Signal Indicators

The turn signal indicator 13a is provided on the vehicle body side 2 (an outer side in the vehicle width direction) while the turn signal indicator 13b is provided on the opening-closing body 3 (an inner side in the vehicle width direction). The turn signal indicators 13a and 13b are disposed in such a way so that, when the opening-closing body 3 is in a closed state, they are at the same height and arranged side by side to one another (with the turn signal indicator 13a on the left and the turn signal indicator 13b on the right). A lateral width of the turn signal indicator 13b is larger than a lateral width of the turn signal indicator 13a.

Figure 2:
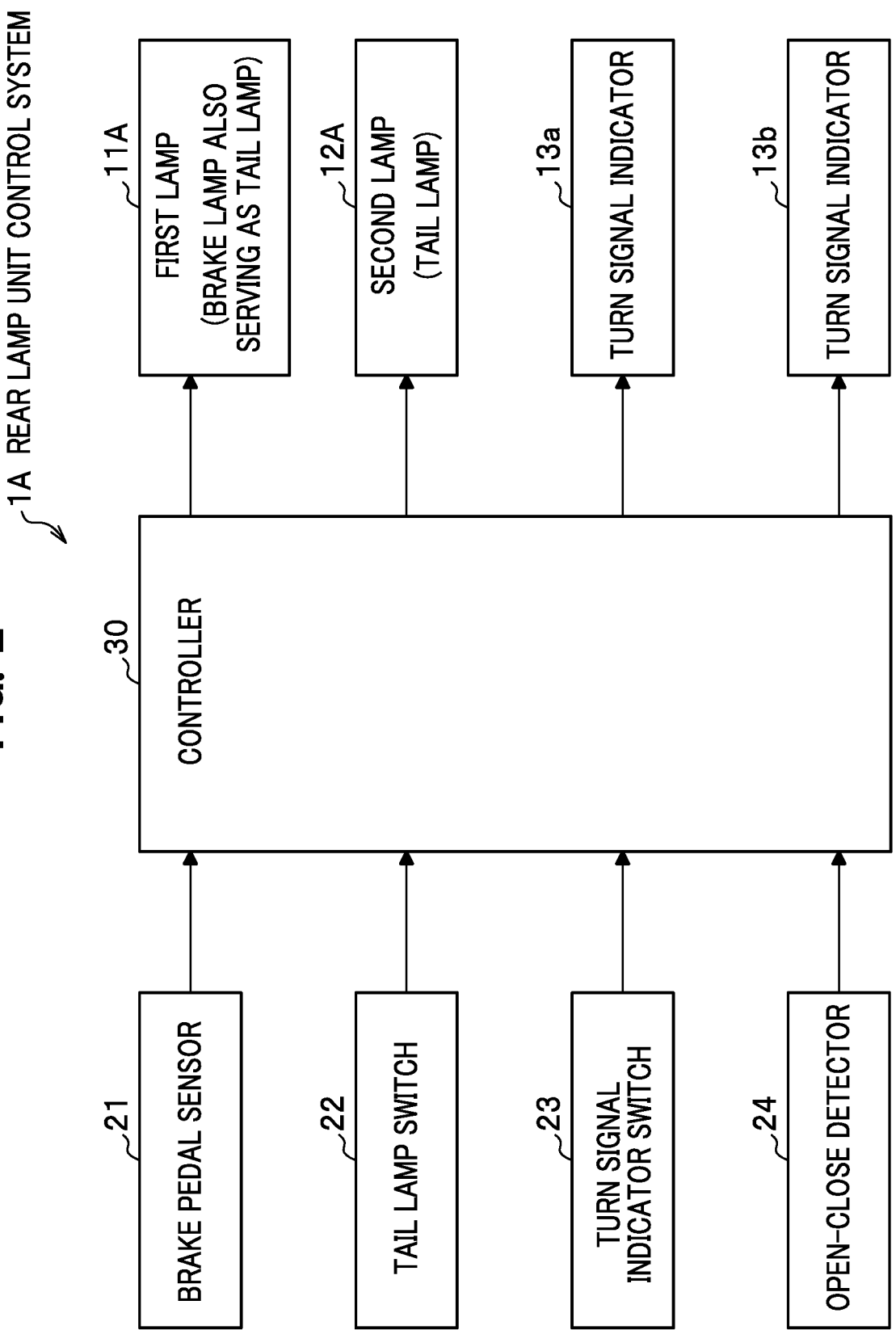
FIG. 2 is a block diagram schematically showing a rear lamp unit control system according to the first embodiment of the disclosure.

As shown in FIG. 2, the rear lamp unit control system 1A includes a brake pedal sensor 21, a tail lamp switch 22, a turn signal indicator switch 23, an open-close detector 24, and the controller 30.

Brake Pedal Sensor

The brake pedal sensor 21 detects an operation (a stepping force, an amount of operation, or the like) of a brake pedal by a driver and outputs a result of detection to the controller 30. Here, instead of the brake pedal sensor 21, a sensor or the like configured to detect a braking state at the time of automated driving may be used as a braking state detector that detects the braking state.

Tail Lamp Switch

The tail lamp switch 22 outputs a result of operation of the tail lamp switch 22 by the driver to the controller 30. A headlight switch for turning headlights on and off may be used as the tail lamp switch 22.

Turn Signal Indicator Switch

The turn signal indicator switch 23 outputs a result of operation of the turn signal indicator switch 23 by the driver to the controller 30.

Open-Close Detector

The open-close detector 24 detects the open or closed state of the aperture 2a with the opening-closing body 3 (the aperture 2a is in an open state when the opening-closing body 3 is open and in a closed state when the opening-closing body 3 is closed). The open-close detector 24 outputs a result of detection to the controller 30.

Controller

The controller 30 is formed from a central processing unit (CPU), a read-only memory (ROM), a random access memory (RAM), an input-output circuit, and the like. The controller 30 controls the first lamp 11A based on the result of detection by the brake pedal sensor 21. The controller 30 controls the second lamp 12A based on the result of operation of the tail lamp switch 22. The controller 30 controls the turn signal indicators 13a and 13b based on the result of operation of the turn signal indicator switch 23.

When turning the first lamp 11A on as the brake lamp, the controller 30 turns the first lamp 11A on at a luminous intensity (a brake luminous intensity) that is within a predetermined range (which is set by regulations, for instance) between a maximum luminous intensity (a maximum brake luminous intensity) and a minimum luminous intensity (a minimum brake luminous intensity) of the brake lamp. When turning the first lamp 11A on as the tail lamp, the controller 30 turns the first lamp 11A on at a luminous intensity (a tail luminous intensity) within a predetermined range (which is set by regulations, for instance) between a maximum luminous intensity (a maximum tail luminous intensity) and a minimum luminous intensity (a minimum tail luminous intensity) of the tail lamp. The brake luminous intensity and the tail luminous intensity are at different luminous intensities from each other, and the brake luminous intensity (or the minimum brake luminous intensity representing the minimum luminous intensity therefor) has a higher luminous intensity than the tail luminous intensity (or the maximum tail luminous intensity representing the maximum luminous intensity therefor).

When turning the second lamp 12A on, the controller 30 turns the second lamp 12A on at a luminous intensity (a tail luminous intensity) in the predetermined range (which is set by regulations, for instance) between the maximum luminous intensity (the maximum tail luminous intensity) and the minimum luminous intensity (the minimum tail luminous intensity) of the tail lamp. The luminous intensity of the second lamp 12A is at the same level of luminous intensity as the luminous intensity of the first lamp 11A when the first lamp 11A is turned on as the tail lamp.

Control Method when Opening-Closing Body is Closed

As shown in FIG. 1A, at normal times, or in other words, when the opening-closing body 3 is closed, the second lamp 12A provided on the opening-closing body 3 is visible from behind the vehicle. Accordingly, when the result of detection by the open-close detector 24 indicates the closed state of the opening-closing body 3, the controller 30 causes the first lamp 11A to function as the brake lamp and causes the second lamp 12A to function as the tail lamp. Specifically, when the result of detection by the brake pedal sensor 21 indicates a step on the brake pedal, the controller 30 turns the first lamp 11A on as the brake lamp by changing the luminous intensity of the first lamp 11A to the brake luminous intensity, which is high luminous intensity. When the result of operation of the tail lamp switch 22 indicates lighting the tail lamp, the controller 30 turns the second lamp 12A on as the tail lamp by turning the second lamp 12A on at the tail luminous intensity, which is low luminous intensity.

Control Method when Opening-Closing Body is Open

Figure 1B:
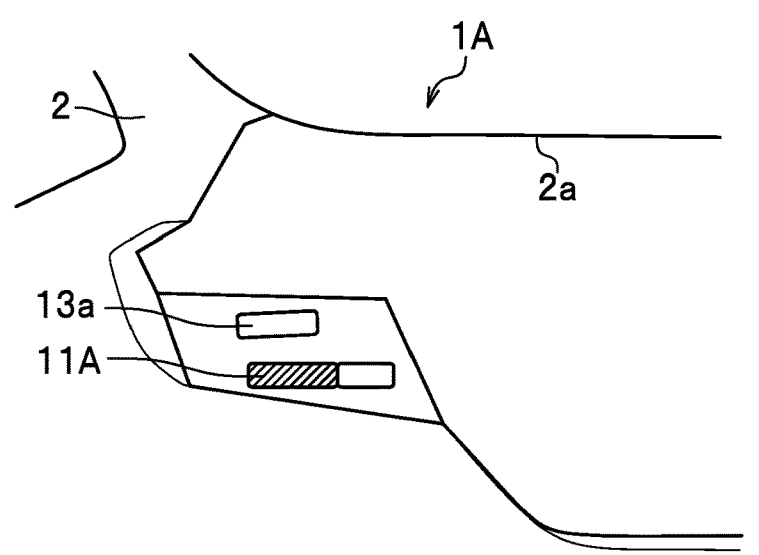
FIG. 1B is a schematic diagram of a rear face of a vehicle adopting a rear lamp unit control system in accordance with the first embodiment of the disclosure.
Figure 1C:
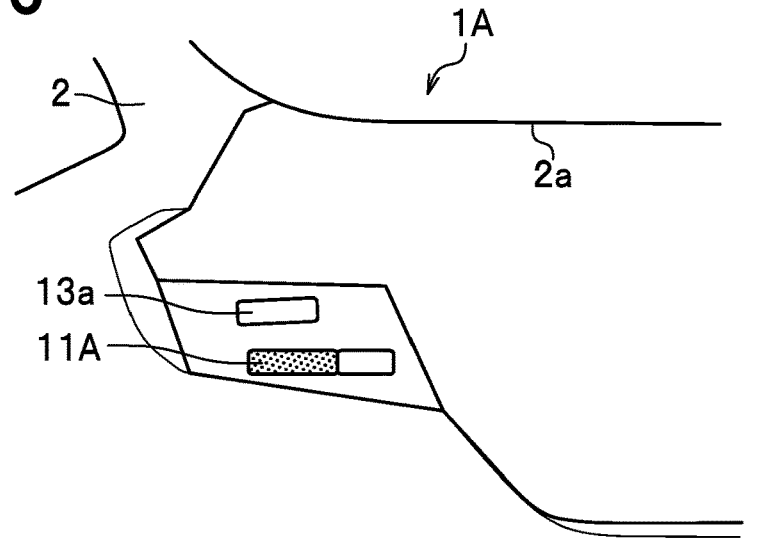
FIG. 1C is a schematic diagram of a rear face of a vehicle adopting a rear lamp unit control system in accordance with the first embodiment of the disclosure.

The opening-closing body 3 is configured such that a front end portion or an upper end portion of the opening-closing body 3 is rotatable relative to the vehicle body around an axis running from left to right. When the opening-closing body 3 is in an open state, the second lamp 12A is turned upward together with the opening-closing body 3 and is facing upward. As shown in FIGS. 1B and 1C, it is difficult (impossible) to view the second lamp 12A provided on the opening-closing body 3 from behind the vehicle when the opening-closing body 3 is open. Accordingly, when the result of detection by the open-close detector 24 indicates an open state of the opening-closing body 3, the controller 30 causes the first lamp 11A that is visible from behind the vehicle to function as the brake lamp and the tail lamp. Specifically, when the result of operation of the tail lamp switch 22 indicates lighting the tail lamp, the controller 30 turns the first lamp 11A on as the tail lamp by changing the luminous intensity of the first lamp 11A to the tail luminous intensity, which is low luminous intensity that is equivalent to that of the second lamp 12A when the opening-closing body 3 is closed (see FIG. 1C). When the result of detection by the brake pedal sensor 21 indicates a step on the brake pedal, the controller 30 turns the first lamp 11A on as the brake lamp by changing the luminous intensity of the first lamp 11A to the brake luminous intensity, which is high luminous intensity (see FIG. 1B). When the result of operation of the tail lamp switch 22 indicates lighting the tail lamp and the result of detection by the brake pedal sensor 21 indicates a step on the brake pedal, the controller 30 turns the first lamp 11A on as the brake lamp by changing the luminous intensity of the first lamp 11A to the brake luminous intensity, which is high luminous intensity (see FIG. 1B).

In one or more embodiments, even in the case where the opening-closing body 3 is open, the controller 30 may be configured to turn the second lamp 12A on as the low luminous intensity tail lamp when the result of operation of the tail lamp switch 22 indicates turning the tail lamp on. Alternatively, in the case where the opening-closing body 3 is open, the controller 30 may be configured to turn the first lamp 11A on as the low luminous intensity tail lamp and to turn the second lamp 12A off when the result of operation of the tail lamp switch 22 indicates turning the tail lamp on.

Operation Example

Figure 3:
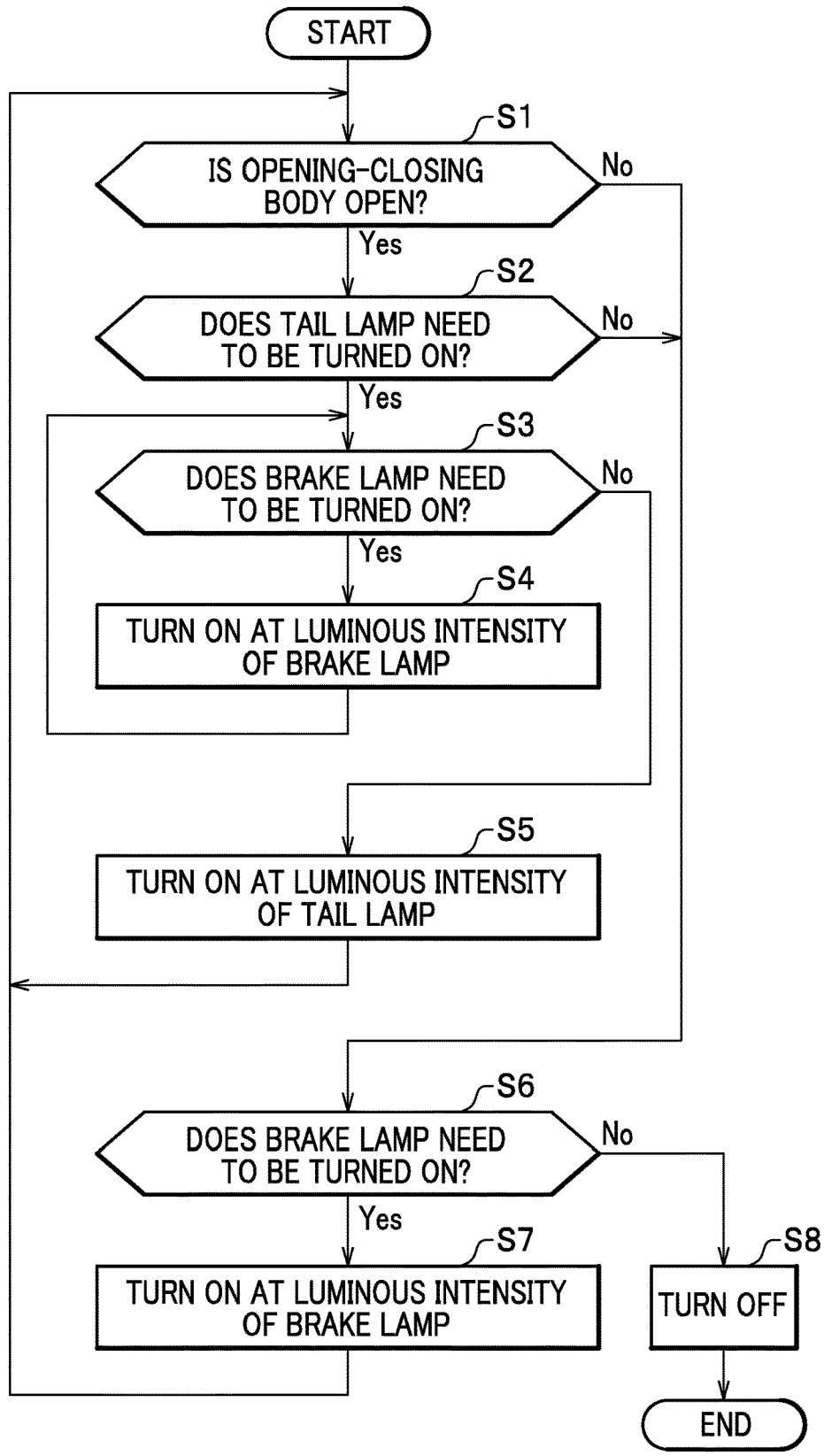
FIG. 3 is a flowchart for explaining an example of control of a first lamp by a rear lamp unit control system according to the first embodiment of the disclosure.

An example of controlling the first lamp 11A by the rear lamp unit control system 1A according to the first embodiment of the disclosure will be described with reference to a flowchart shown in FIG. 3. In the flowchart shown in FIG. 3, steps S1 to S5 constitute a flow for causing the first lamp 11A to function as the tail lamp in addition to the brake lamp, while steps S6 to S8 constitute a flow for causing the first lamp 11A to function as the brake lamp. The first lamp 11A is set to an off-state as an initial state.

In step S1, the controller 30 determines whether or not the opening-closing body 3 is open. Here, the controller 30 can use the result of detection by the open-close detector 24 or use a result of operation of an opening-closing body switch (not shown) that is operated by the driver to open the opening-closing body 3.

In step S2, the controller 30 determines whether or not the tail lamp needs to be turned on. Here, the controller 30 can use the result of operation of the tail lamp switch 22 or use a result of detection by a sensor (not shown) that is configured to detect brightness around the vehicle.

In steps S3 and S6, the controller 30 determines whether or not the brake lamp needs to be turned on. Here, the controller 30 can use the result of detection by the brake pedal sensor 21 or use a signal from an automatic braking system (not illustrated).

When the opening-closing body 3 is open (yes in step S1), the tail lamp needs to be turned on (yes in step S2), and the brake lamp needs to be turned on (yes in step S3), the controller 30 turns the first lamp 11A on (step S4) at the luminous intensity of the brake lamp (the brake luminous intensity, high luminous intensity). After executing step S4, this flow returns to step S3.

When the opening-closing body 3 is open (yes in step S1), the tail lamp needs to be turned on (yes in step S2), and the brake lamp does not need to be turned on (no in step S3), the controller 30 turns the first lamp 11A on (step S5) at the luminous intensity of the tail lamp (the tail luminous intensity, low luminous intensity). After executing step S5, this flow returns to step S1.

This flow transitions to step S6 when the opening-closing body 3 is closed (no in step S1) or when the tail lamp does not need to be turned on although the opening-closing body 3 is open (yes in step S1 and no in step S2). When the brake lamp needs to be turned on (yes in step S6), the controller 30 turns the first lamp 11A on (step S7) at the luminous intensity of the brake lamp (the brake luminous intensity, high luminous intensity). After executing step S7, this flow returns to step S1. On the other hand, when the brake lamp does not need to be turned on (no in step S6), the controller 30 turns the first lamp 11A off (step S8).

The rear lamp unit control system 1A according to the first embodiment of the disclosure includes the first lamp 11A provided on the vehicle body side of the vehicle rear face, the second lamp 12A provided on the opening-closing body side of the vehicle rear face, and the controller 30 configured to control the first lamp 11A and the second lamp 12A. When the opening-closing body 3 is in a closed state, the controller 30 controls the first lamp 11A and the second lamp 12A to be turned on at different luminous intensities from each other. In the case where the second lamp 12A needs to be turned on when the opening-closing body 3 is in an open state, the controller 30 is configured to turn the first lamp 11A on at a luminous intensity that is equivalent to that of the second lamp 12A when the second lamp 12A is turned on.

Therefore, even when the opening-closing body 3 is in an open state, the rear lamp unit control system 1A can realize suitable information transmission toward the rear by achieving the function of the second lamp 12A (provided on the opening-closing body 3) with the first lamp 11A (provided on the vehicle body rear face 2). The rear lamp unit control system 1A can improve design freedom of the vehicle rear face by disposing the second lamp 12A on the opening-closing body 3 side.

In the rear lamp unit control system 1A, the first lamp 11A is a brake lamp and the second lamp 12A is a tail lamp having lower luminous intensity than that of the brake lamp. When the tail lamp needs to be turned on and the opening-closing body 3 is in an open state, the controller 30 turns the first lamp 11A on at a luminous intensity that is equivalent to a luminous intensity of the second lamp 12A when the second lamp 12A is turned on.

Therefore, even when the opening-closing body 3 is in an open state, the rear lamp unit control system 1A can realize suitable information transmission toward the rear and improve design freedom of the vehicle rear face by achieving the function of the tail lamp with the first lamp 11A provided on the vehicle body rear face 2.

Second Embodiment

A rear lamp unit control system according to a second embodiment of the disclosure will be described with a main focus on features that are different to those of the rear lamp unit control system 1A according to the first embodiment. The second embodiment is different from the first embodiment in that the second lamp provided on the opening-closing body 3 functions as a brake lamp while the first lamp provided on the vehicle body rear face 2 mainly functions as a tail lamp but also functions as a brake lamp as needed.

Figure 4A:
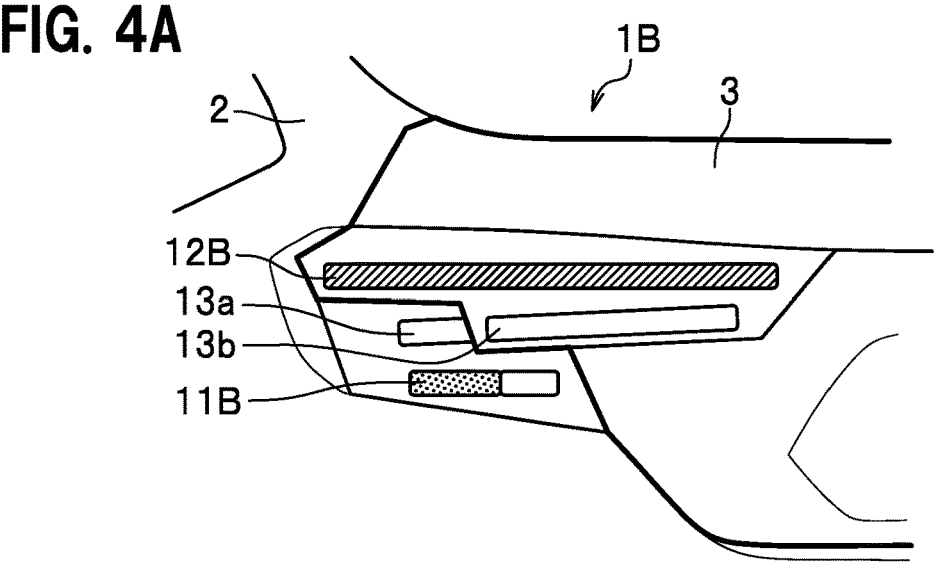
FIG. 4A is a schematic diagram showing a rear face of a vehicle adopting a rear lamp unit control system in accordance with a second embodiment of the disclosure.
Figure 4B:
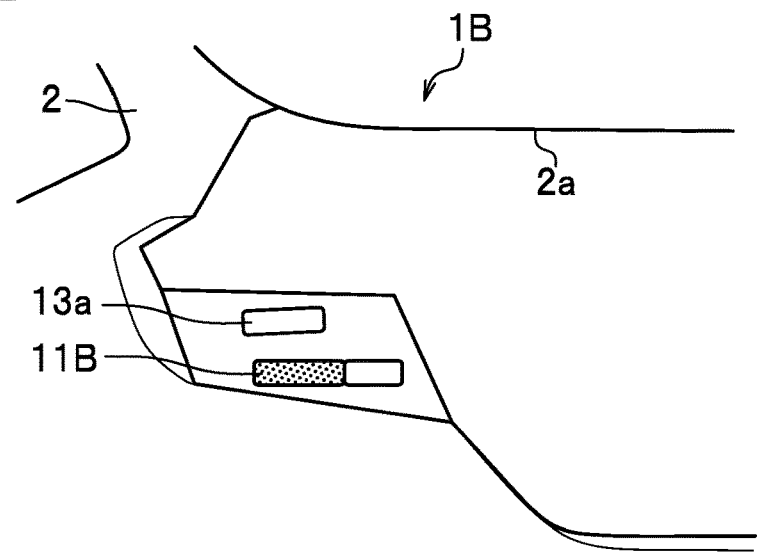
FIG. 4B is a schematic diagram showing a rear face of a vehicle adopting a rear lamp unit control system in accordance with the second embodiment of the disclosure.
Figure 4C:
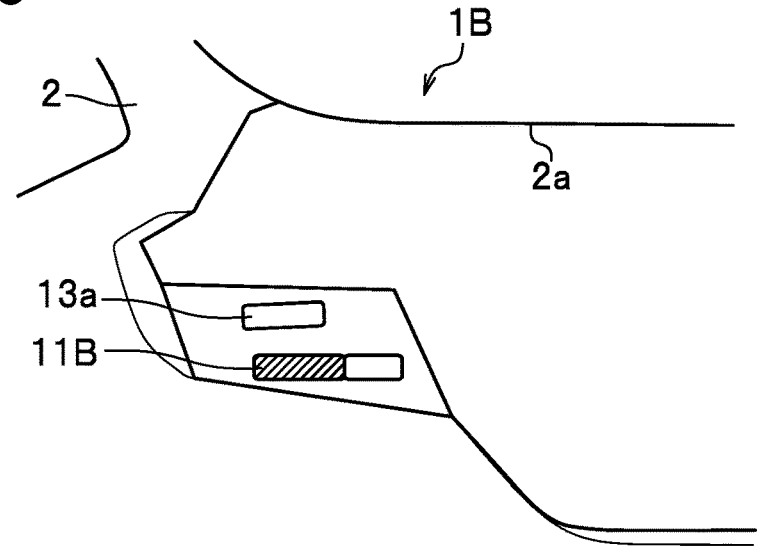
FIG. 4C is a schematic diagram showing a rear face of a vehicle adopting a rear lamp unit control system in accordance with the second embodiment of the disclosure.
Figure 5:
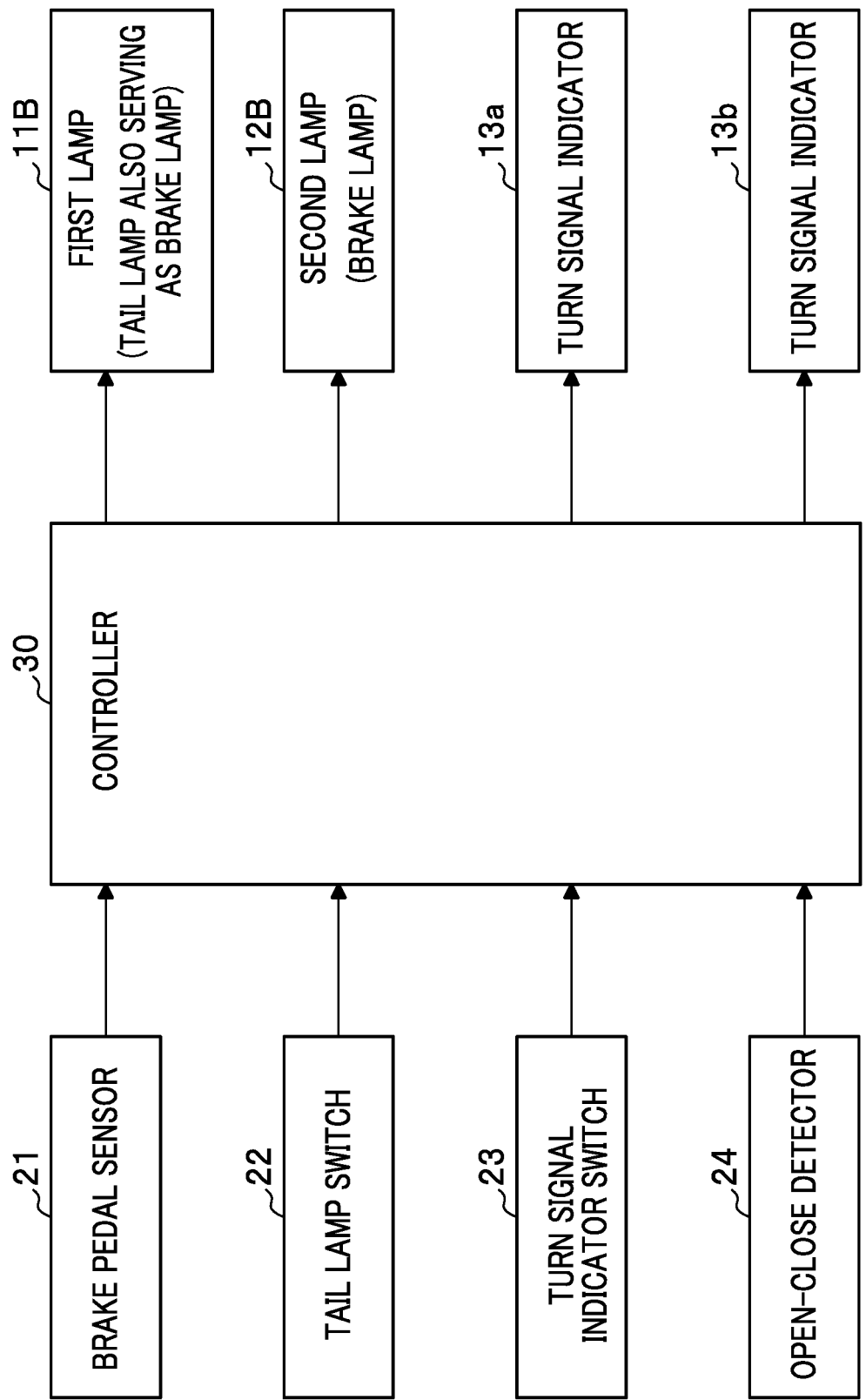
FIG. 5 is a block diagram schematically showing a rear lamp unit control system in accordance with the second embodiment of the disclosure.

As shown in FIGS. 4 and 5, a rear lamp unit control system 1B according to the second embodiment of the disclosure includes a first lamp 11B and a second lamp 12B instead of the first lamp 11A and the second lamp 12A.

First Lamp (Tail Lamp Also Serving as Brake Lamp

The first lamp 11B is provided on the vehicle body rear face 2. The first lamp 11B is configured to change its luminous intensity through control by the controller 30. The first lamp 11B is turned on mainly as a low luminous intensity tail lamp, but is turned on as the high luminous intensity brake lamp as needed.

Second Lamp (Brake Lamp)

The second lamp 12B is provided on the opening-closing body (such as a lid of a trunk room or a tailgate; hereinafter simply referred to as the opening-closing body) 3 that can open and close the aperture 2a of the vehicle rear face. The second lamp 12B is turned on as a high luminous intensity brake lamp.

When turning the first lamp 11B on as the tail lamp, the controller 30 turns the first lamp 11B on at a luminous intensity (a tail luminous intensity) within a predetermined range (which is set by regulations, for instance) ranging between a maximum luminous intensity (a maximum tail luminous intensity) and a minimum luminous intensity (a minimum tail luminous intensity) of the tail lamp. When turning the first lamp 11B on as the brake lamp, the controller 30 turns the first lamp 11B on at a luminous intensity (a brake luminous intensity) within a predetermined range (which is set by regulations, for instance) ranging between a maximum luminous intensity (a maximum brake luminous intensity) and a minimum luminous intensity (a minimum brake luminous intensity) of the brake lamp. The brake luminous intensity and the tail luminous intensity have different luminous intensities from each other, and the brake luminous intensity (or the minimum brake luminous intensity representing the minimum luminous intensity thereof) has a higher luminous intensity than the tail luminous intensity (or the maximum tail luminous intensity representing the maximum luminous intensity thereof).

When turning the second lamp 12B on, the controller 30 turns the second lamp 12B on at a luminous intensity (a brake luminous intensity) within the predetermined range (which is set by regulations, for instance) between the maximum luminous intensity (the maximum brake luminous intensity) and the minimum luminous intensity (the minimum brake luminous intensity) of the brake lamp. The luminous intensity of the second lamp 12B is the same as the luminous intensity of the first lamp 11B when the first lamp 11B is turned on as the brake lamp.

Control Method when Opening-Closing Body is Closed

As shown in FIG. 4A, at normal times, or in other words, when the result of detection by the open-close detector 24 indicates a closed state of the opening-closing body 3, the controller 30 causes the first lamp 11B to function as the tail lamp and causes the second lamp 12B to function as the brake lamp. Specifically, when the result of operation of the tail lamp switch 22 indicates lighting the tail lamp, the controller 30 turns the first lamp 11B on as the tail lamp by changing the luminous intensity of the first lamp 11B to the tail luminous intensity, which is low luminous intensity. When the result of detection by the brake pedal sensor 21 indicates a step on the brake pedal, the controller 30 turns the second lamp 12B on as the brake lamp at the brake luminous intensity, which is high luminous intensity.

Control Method when Opening-Closing Body is Open

As shown in FIGS. 4B and 4C, when the result of detection by the open-close detector 24 indicates an open state of the opening-closing body 3, the controller 30 causes the first lamp 11B, which is visible from behind the vehicle, to function as the tail lamp and as the brake lamp. Specifically, when the result of operation of the tail lamp switch 22 indicates lighting the tail lamp, the controller 30 turns the first lamp 11B on as the tail lamp by changing the luminous intensity of the first lamp 11B to the tail luminous intensity, which is low luminous intensity (see FIG. 4B). On the other hand, when the result of detection by the brake pedal sensor 21 indicates a step on the brake pedal, the controller 30 turns the first lamp 11B on as the brake lamp by changing the luminous intensity of the first lamp 11B to the brake luminous intensity, which is high luminous intensity that is equivalent to the luminous intensity of the second lamp 12B when the opening-closing body 3 is closed (see FIG. 4C). Here, when the result of operation of the tail lamp switch 22 indicates lighting the tail lamp and the result of detection by the brake pedal sensor 21 indicates a step on the brake pedal, the controller 30 turns the first lamp 11B on as the high luminous intensity brake lamp (see FIG. 4C).

In one or more embodiments, even in the case where the opening-closing body 3 is open, the controller 30 may be configured to turn the second lamp 12B on as the high luminous intensity brake lamp when the result of detection by the brake pedal sensor 21 indicates a step on the brake pedal. Alternatively, in the case where the opening-closing body 3 is open, the controller 30 may be configured to turn the first lamp 11B on as the high luminous intensity brake lamp and to turn the second lamp 12B off when the result of detection by the brake pedal sensor 21 indicates a step on the brake pedal.

Operation Example

An example of controlling the first lamp 11B by the rear lamp unit control system 1B according to the second embodiment of the disclosure will be described with reference to a flowchart shown in FIG. 6. In the flowchart shown in FIG. 6, steps S11 to S13 constitute a flow for causing the first lamp 11B to function as the brake lamp while steps S14 to S16 constitute a flow for causing the first lamp 11B to function as the tail lamp. The first lamp 11B is set to an off-state as an initial state.

In step S11, the controller 30 determines whether or not the opening-closing body 3 is open. Here, the controller 30 can use the result of detection by the open-close detector 24 or use the result of operation of the opening-closing body switch (not shown) that is operated by the driver to open the opening-closing body 3.

In step S12, the controller 30 determines whether or not the brake lamp needs to be turned on. Here, the controller 30 can use the result of detection by the brake pedal sensor 21 or use a signal from an automatic braking system (not illustrated).

When the opening-closing body 3 is open (yes in step S11) and the brake lamp needs to be turned on (yes in step S12), the controller 30 turns the first lamp 11B on (step S13) at the luminous intensity of the brake lamp (the brake luminous intensity, high luminous intensity). After executing step S13, this flow returns to step S12.

This flow transitions to step S14 when the opening-closing body 3 is closed (no in step S11) or when the brake lamp does not need to be turned on although the opening-closing body 3 is open (yes in step S11 and no in step S12). When the tail lamp needs to be turned on (yes in step S14), the controller 30 turns the first lamp 11B on (step S15) at the luminous intensity of the tail lamp (the tail luminous intensity, low luminous intensity). After executing step S15, this flow returns to step S11. On the other hand, when the tail lamp does not need to be turned on (no in step S14), the controller 30 turns the first lamp 11B off (step S16).

In the rear lamp unit control system 1B according to the second embodiment of the disclosure, the first lamp 11B is the tail lamp and the second lamp 12B is the brake lamp having higher luminous intensity than that of the tail lamp. When the brake lamp needs to be turned on and the opening-closing body 3 is in an open state, the controller 30 turns the first lamp 11B on at a luminous intensity that is equivalent to the luminous intensity of the second lamp 12B when the second lamp 12B is turned on.

Therefore, even when the opening-closing body 3 is in an open state, the rear lamp unit control system 1B can realize a suitable information transmission toward the rear by achieving the function of the brake lamp with the first lamp 11B provided on the vehicle body rear face 2. This also means that the rear lamp unit control system 1B can improve design freedom of the vehicle rear face.

An object of the disclosure is to provide a rear lamp unit control system which can improve design freedom of a vehicle rear face.

According to an embodiment of the disclosure, it is possible to realize suitable information transmission toward the rear by achieving a function of the second lamp (provided on the opening-closing body) by using the first lamp (provided on the vehicle body rear face), and to improve design freedom of the vehicle rear face by disposing the second lamp on the opening-closing body side.

Although certain embodiments of the disclosure have been described above, the disclosure is not limited only to the above-described embodiments. Embodiments can be modified within the range not departing from the scope of the disclosure. For example, the disclosure is also applicable to a vehicle rear face with an opening-closing body whose edge portion is rotatably attached to a vehicle body so that the opening-closing body is rotatable around a vertical axis. Here, a first light provided on the vehicle body side is positioned so that the first light is visible from behind the vehicle and is not hidden by the opening-closing body in an open state.

In the first embodiment, respective luminous intensities of the first lamp 11A and the second lamp 12A when they are turned on as a tail lamp may be different from each other as long as the luminous intensities fall within the range between the maximum value (the maximum tail luminous intensity) and the minimum value (the minimum tail luminous intensity) of the tail luminous intensity. Likewise, in the second embodiment, respective luminous intensities of the first lamp 11B and the second lamp 12B when they are turned on as a brake lamp may be different from each other as long as the luminous intensities fall within the range between the maximum value (the maximum brake luminous intensity) and the minimum value (the minimum brake luminous intensity) of the brake luminous intensity.

What is claimed is:

1. A rear lamp unit control system for a vehicle, the rear lamp unit control system comprising:
   a first lamp provided on a vehicle body side of a vehicle rear face;
   a second lamp provided on an opening-closing body side of the vehicle rear face; and
   a controller configured to control the first lamp and the second lamp, wherein
   when an opening-closing body of the vehicle at the vehicle rear face is in a closed state, the controller is configured to control the first lamp and the second lamp so that the first lamp and the second lamp turn on at different luminous intensities to each other, and
   in response to the second lamp being in need to be turned on when the opening-closing body is in an open state, the controller is configured to turn the first lamp on at a luminous intensity that is equivalent to a luminous intensity of the second lamp when the second lamp is turned on.

2. The rear lamp unit control system according to claim 1, wherein
   the first lamp includes a brake lamp,
   the second lamp includes a tail lamp having a lower luminous intensity than a luminous intensity of the brake lamp, and
   in response to the tail lamp being in need to be turned on when the opening-closing body is in an open state, the controller is configured to turn the first lamp on at the luminous intensity that is equivalent to the luminous intensity of the second lamp when the second lamp is turned on.

3. The rear lamp unit control system according to claim 1, wherein
   the first lamp includes a tail lamp,
   the second lamp includes a brake lamp having a higher luminous intensity than a luminous intensity of the tail lamp, and
   in response to the brake lamp being in need to be turned on when the opening-closing body is in an open state, the controller is configured to turn the first lamp on at the luminous intensity that is equivalent to the luminous intensity of the second lamp when the second lamp is turned on.

* * * * *